United States Patent Office 3,229,051
Patented Jan. 11, 1966

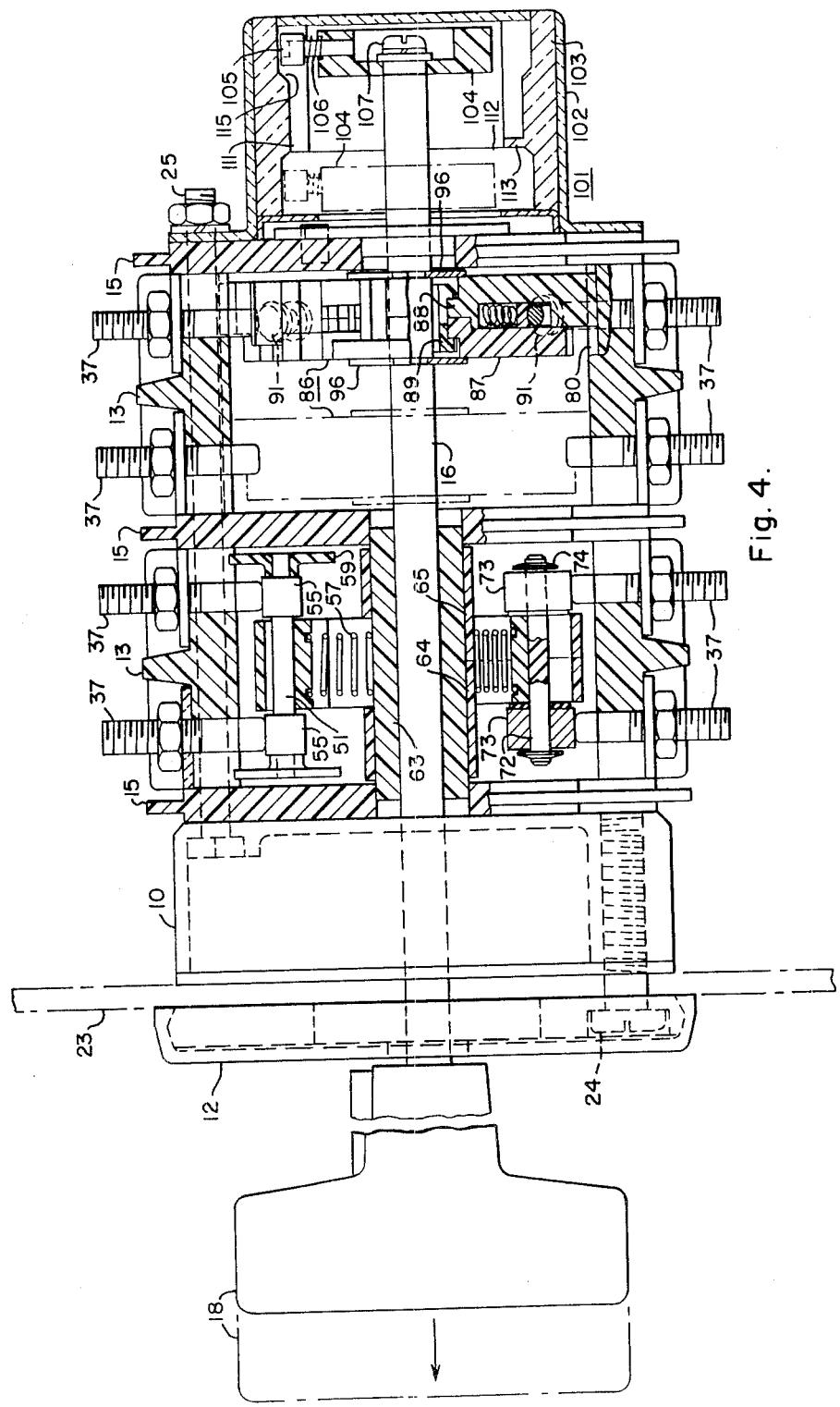

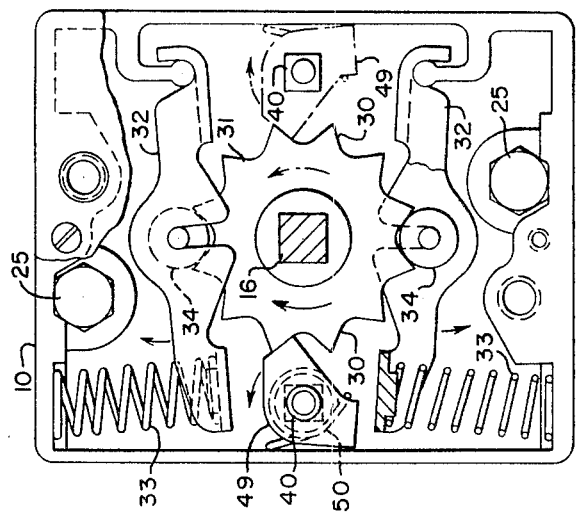
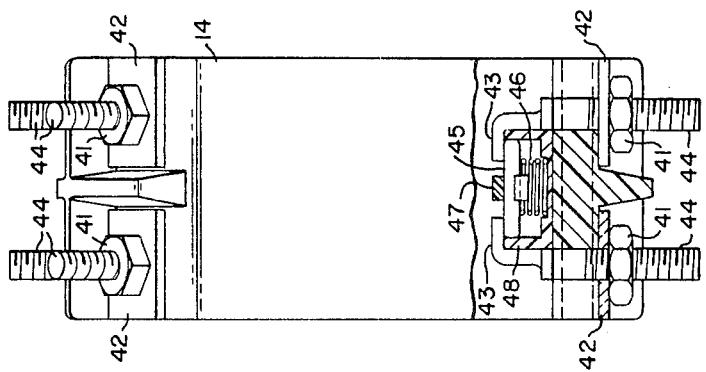
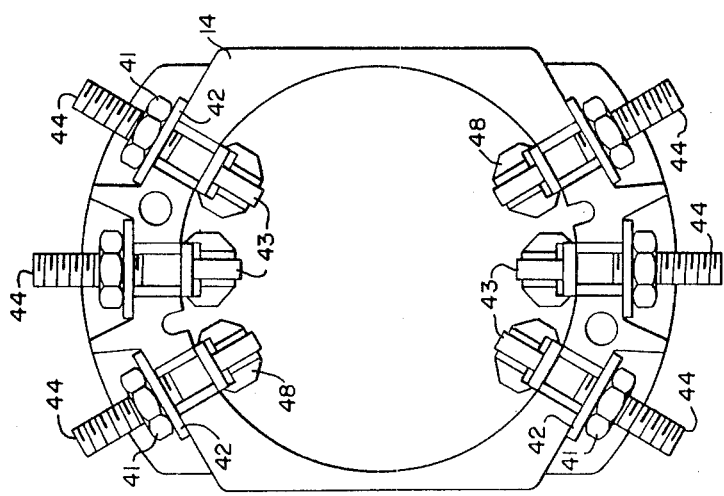

3,229,051
COMBINED ROTARY AND PUSH-PULL CONTACT STRUCTURE WITH IMPROVED SHAFT CAM MEANS
Richard Hauser, Pittsburgh, and Paul Silvius, Franklin Township, Westmoreland County, Pa., assignors to Westinghouse Electric Corporation, East Pittsburgh, Pa., a corporation of Pennsylvania
Filed May 24, 1963, Ser. No. 283,092
12 Claims. (Cl. 200—11)

This invention relates, generally, to electric switches and, more particularly, to control switches of the rotary type suitable for controlling a plurality of electrical circuits.

In addition to controlling the operation of circuit breakers and other electrically operated devices, control switches are utilized to perform auxiliary interlocking and controlling functions which require sufficient contact members for controlling a relatively large number of electrical circuits. Prior switches have required changes in the internal structure or arrangement of contact members in order to obtain the desired circuitry. Heretofore, it has been necessary for manufacturers to carry switches of many different styles in stock or to delay the filling of orders until switches meeting particular circuit requirements could be built. This caused inconvenience to customers and also increased the cost of the switches because of the work involved in handling special orders.

An object of this invention is to provide a rotary switch having standardized parts which can be assembled to meet a high percentage of control circuit requirements.

Another object of the invention is to provide different contact stages which can be assembled in the switch to perform different control functions.

Still another object of the invention is to provide a rotary switch which can be operated only in a predetermined direction.

A further object of the invention is to provide contact stages which cooperate to perform transfer switching operations without interrupting certain of the transferred circuits.

Still another object of the invention is to provide a switch having an operating shaft which may be rotated and also moved axially to perform switching operations.

A still further object of the invention is to provide for readily changing the direction and the angular position in which the shaft of the switch may be moved axially to perform switching operations.

Other objects of the invention will be explained fully hereinafter or will be apparent to those skilled in the art.

In accordance with one embodiment of the invention, a rotary switch is built by assembling one or more contact stages on an operating mechanism having a shaft which may be rotated and also moved axially. A contact stage may have 12 contacts or 6 contacts. Stationary contact members are spaced at 30° angles in two rows around the periphery of a generally cylindrical stator housing molded from insulating material. Movable contact members comprising rollers composed of conducting material are carried by a rotor molded from insulating material and rotated by the shaft. A contact stage having a normally closed bridging contact member actuated by a cam driven by the shaft is provided. A contact roller carried by a housing moved axially with the shaft may be assembled in the switch.

For a better understanding of the nature and objects of the invention, reference may be had to the following detailed description, taken in conjunction with the accompanying drawings, in which:

FIG. 4 is a view, partly in side elevation and partly in section, of a modified switch embodying other features of the invention;

FIG. 8 is a view, in end elevation, of a stator housing and stationary contact assembly for a switch having 6 normally closed contacts;

FIG. 9 is a view, partly in side elevation and partly in section, of the stator shown in FIG. 8;

FIG. 10 is a view, in front elevation, of a contact positioning assembly for the switch;

Figure 1:
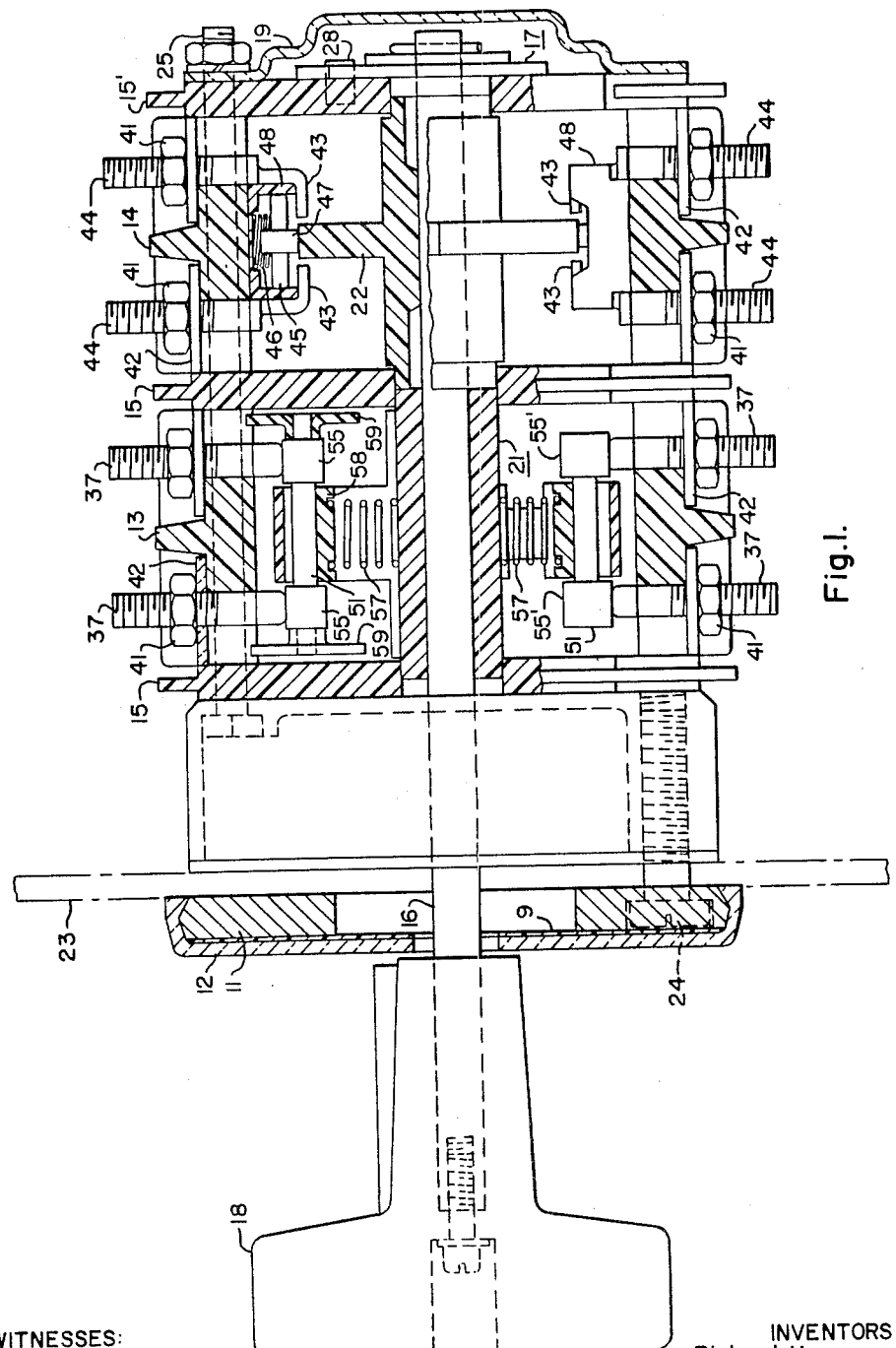
FIGURE 1 is a view, partly in side elevation and partly in section, of a rotary switch embodying certain features of the invention.

Referring to the drawings, and particularly to FIG. 1, the switch structure shown therein comprises a mechanism housing 10, a dial plate 11, a dial plate cover 12, a dial name plate 9, a first stage stator housing 13, a second stage stator housing 14, spacing members 15 and 15′ disposed between the stator housings and at the ends of the stator housings, a shaft 16 extending through the switch structure and rotatably disposed in a bearing 17 at one end of the switch structure and in a similar bearing (not shown)

near the other end of the switch structure, a handle 18 removably attached to one end of the shaft 16, an end cover 19 removably attached at the ends of the switch opposite the handle 18, a rotor assembly 21 and a cam 22, both of which are carried by the shaft 16 and are rotatable with the shaft. The switch may be mounted on a switchboard panel 23 or other supporting structure by means of screws 24 which extend through the dial plate 11, disposed at one side of the panel 23, into the housing 10 disposed at the other side of the panel 23. The heads of the screws 24 are covered by the dial name plate 9 over which is snapped the dial plate cover 12 which is composed of a transparent plastic material, such as a styrene resin.

The stator housings 13 and 14 are retained in axial alignment on the switch by means of bolts 25 which extend from the mechanism housing 10 through the stator housings. It will be understood that additional contact stages may be provided by utilizing longer bolts 25 and increasing the number of stator housings. The additional contact stages may be of the various types which will be described more fully hereinafter. In this manner a rotary switch may be provided which is capable of performing a wide variety of switching functions.

The stator housings 13 and 14, the spacing members 15 and 15', the rotors 21 and the cam 22 are preferably molded from a glass polyester, metal filled, material having excellent non-tracking arc and wear resistant characteristics. Thus, the parts of the switch which are subject to wear have a relatively long life.

Figure 2:
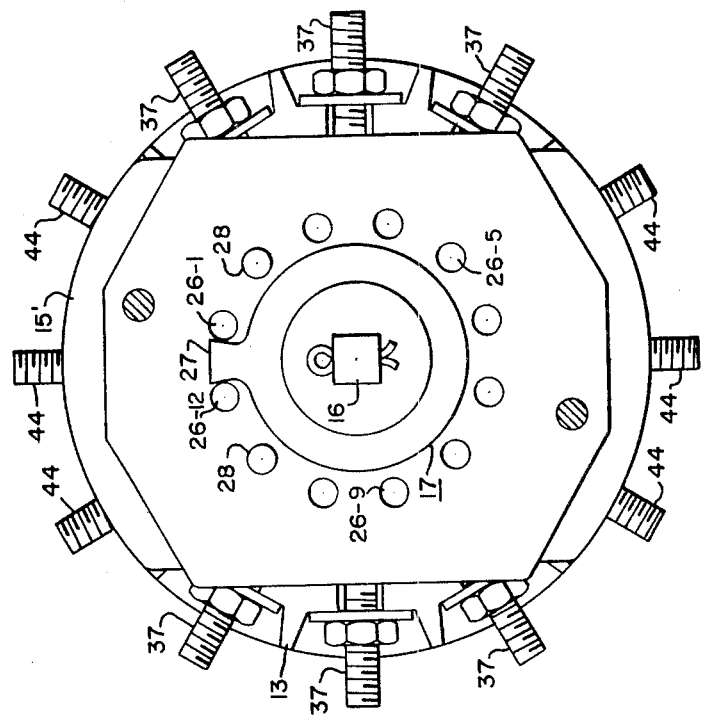
FIG. 2 is a view, in rear elevation, of the switch shown in FIG. 1, the end cover plate being removed.
Figure 3:
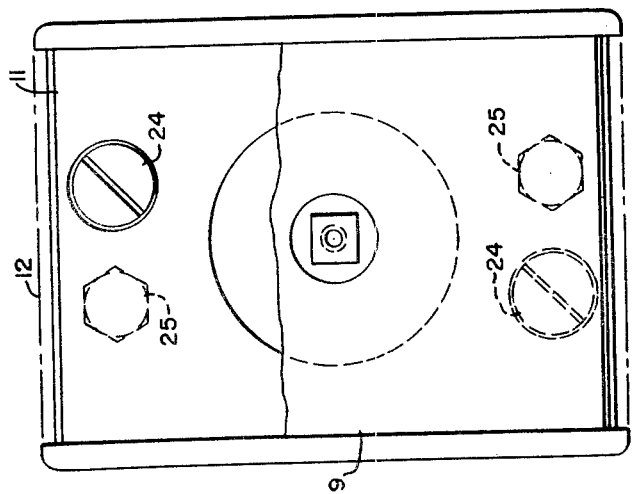
FIG. 3 is a view, in front elevation, of the switch, the operating handle and the dial plate cover being removed.

The end spacer member 15' cooperates with the bearing or stop plate 17 to limit the rotation of the shaft 16 in either direction. As shown in FIG. 2, a plurality of openings, which are numbered from 26–1 to 26–12, are provided in the one face of the spacer 15'. The plate 17 has a projection 27 thereon which is disposed to engage stop pins 28 which may be placed in selected holes of the openings 26–1 to 26–12. The plate 17 rotates with the shaft 16. Thus, the stop pins 28 may be so located that rotation of the shaft 16 is stopped at desired angular positions in either direction from the normal or off position.

As shown in FIG. 10, the mechanism housing 10 may contain a positioning or star wheel assembly. A star wheel 31 is disposed on the shaft 16 to rotate with the shaft. The wheel 31 has twelve notches 30 spaced around its periphery at 30° angles. Two levers 32 are pivotally mounted in the housing 10 at opposite sides of the star wheel and are biased toward the star wheel by springs 33. Each lever 32 carries a roller 34 which engages the notched surface of the star wheel. Thus, the shaft 16 is releasably retained in any one of twelve angular positions.

Figure 11:
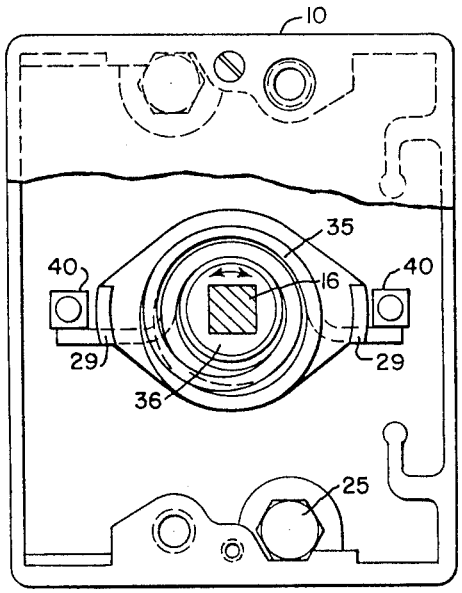
FIG. 11 is a view, in front elevation, of a spring return assembly for the switch.

If it is desired to provide a switch in which the shaft 16 is returned to the normal or off position when the handle 18 is released, a spring return assembly may be provided in the housing 10 in place of the star wheel assembly. As shown in FIG. 11, a doubly wound spring 35 is disposed on a bushing 36 which rotates with the shaft 16. The bushing 36 is provided with projections 29 which engage the ends of the spring 35 and the ends of the spring engage projections 40 in the housing 10 to return the shaft 16 to its normal or off position when the handle 18 is released.

Also, if it is desired to provide a switch having unidirectional operation, a pawl 49 may be mounted on a rounded upper portion of one of the pins or projections 40 to engage the teeth on the star wheel 31. A torsion spring 50 biases the pawl into engagement with the star wheel. When the pawl 49 is in the position shown by the full lines in FIG. 10, the switch can be operated clockwise only. If the pawl is placed on the other pin 40, as shown by the dot-dash lines, the switch can be operated only counter-clockwise.

Figure 6:
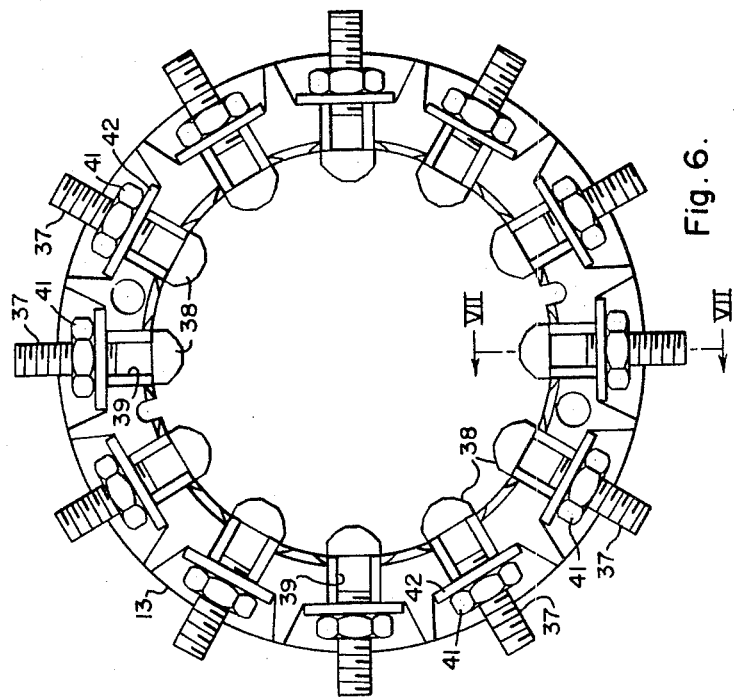
FIG. 6 is a view, in end elevation, of a stator housing and stationary contact assembly for a switch of the 12 contact type.
Figure 7:
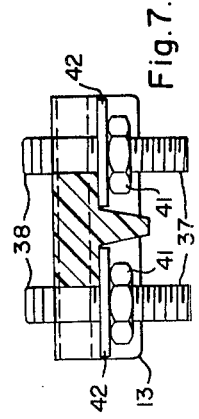
FIG. 7 is a sectional view of the stator shown in FIG. 6 taken along the line VII—VII.

As shown in FIGS. 6 and 7, twelve pairs of stationary contact members 37 may be disposed in two rows around the periphery of the stator housing 13. The twelve pairs of contact members are angularly or circumferentially spaced at 30° angles around the periphery. The two contact members 37 of each pair are spaced axially of the stator housing. Each member 37 functions as a terminal member and as a contact member. The member 37 has a head 38 which is enlarged in one plane to engage the walls of a recess 39 in the stator housing. The head 38 is beveled in the manner shown in FIG. 6 and is engaged by a contact roller carried by a rotor as will be described more fully hereinafter. The members 37 are composed of a suitable conducting material and the heads 38 may be silver plated if desired.

Each member 37 is retained in the stator housing by means of a nut 41 threaded onto the member 37 to engage a washer 42 composed of transparent material. The washer 42 enables a person to look through the opening or recess 39 to observe when the contact roller carried by the rotor is engaging a particular stationary contact member. If a twelve contact stage is not required, a stator housing having only six pairs of stationary contact members may be utilized. The six pairs of stationary contact members may be arranged in the manner shown in FIGS. 8 and 9.

For certain applications, for example when a switch is utilized to change an ammeter from one current transformer to another, it is desirable to provide a switch having normally closed contact members which can be opened only after other contact members have been closed, thereby maintaining a closed circuit for the secondary winding of the current transformer. The stator housing 14 shown in FIGS. 8 and 9 has normally closed contact members.

As shown most clearly in FIG. 9, the inner ends 43 of each pair of axially spaced contact members 44 extend toward each other. A bridging contact member 45 is biased into engagement with the ends 43 by a spring 46. The bridging contact member 45 is disengaged from the ends 43 of the contact members 44 when a roller 47 on the member 45 is engaged by the cam 22 as will be described more fully hereinafter. Movement of the bridging member 45 is guided by a contact guide 48 disposed between the contact members 44.

Figure 14:
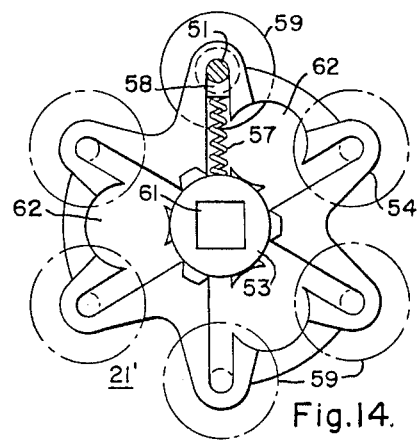
FIG. 14 is a view, in end elevation, of a six contact rotor assembly, only one typical contact roller being shown.
Figure 12:
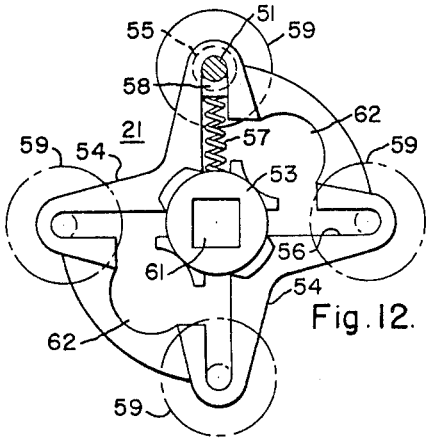
FIG. 12 is a view, in end elevation, of a four contact rotor assembly for the switch, only one typical contact roller being shown in the rotor.
Figure 13:
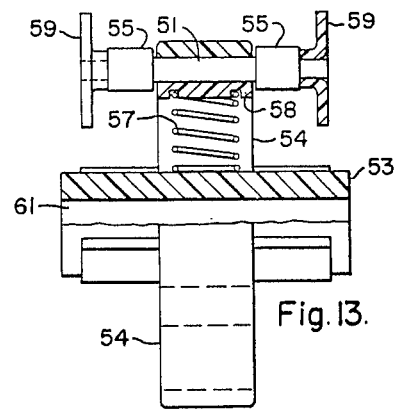
FIG. 13 is a view, partly in section and partly in side elevation of the rotor shown in FIG. 12.

Depending upon the number of different operating positions desired, the rotor assembly 21 may have four contact rollers 51 disposed at 90° angles as shown in FIGS. 12 and 13, or it may have six contact rollers 51 disposed at 60° angles as shown in FIG. 14. The rotor is of a one-piece construction and comprises a hub 53 and arms 54 formed integrally with the hub 53. As previously explained, the rotor may be molded from a glass polyester material.

The contact roller 51 is composed of a suitable conducting material and is provided with two spaced integrally formed enlarged contact portions 55. Each roller 51 is disposed in a slot 56 provided in each one of the arms 54 of the rotor. The roller 51 is biased radially outwardly in the rotor by a spring 57 which is generally of a rectangular shape. A spring seat 58 is disposed between the one end of the spring 57 and the roller 51.

A wheel 59, composed of insulating material, is rotatably mounted on each end of the contact roller 51 outside of the enlarged contact portion 55. The function of the wheels 59 will be described more fully hereinafter.

The hub 53 has a square opening 61 for receiving the shaft 16. Thus, the rotor assembly 21 rotates with the shaft 16. The rotor assembly 21' shown in FIG. 14 is similar to the one shown in FIGS. 12 and 13 except that it has six arms 54 for carrying six contact rollers instead of four contact rollers. The rotors are provided with openings 62 between pairs of arms 54 to permit the contact rollers 51 to be assembled in the rotor.

For some applications it may be desirable to provide a rotor of a slip contact type. As shown in FIGS. 15 to 18, such a rotor may be made in three sections 63, 64 and 65. The one section 63 has a hub 66 with a square opening 67 extending therethrough for receiving the shaft 16.

The sections 64 and 65 are similar in structure. Each one of these sections has a hub 68 with an opening 69 therein of a diameter to fit over the hub 66 of the section 63. Thus, these sections may be assembled in the manner shown in FIG. 16 with the hubs 68 overlapping the hub 66.

Figure 15:
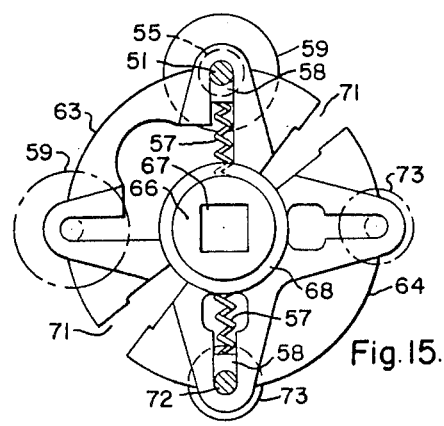
FIG. 15 is a view, in end elevation, of a slip contact rotor assembly.

As shown most clearly in FIG. 15, a space 71 is provided between the flange portions of the sections to provide a lost motion between these sections. Thus, the sections 63 rotates with the shaft 16 and drives the sections 64 and 65 after it has rotated a predetermined amount in one direction. When the shaft 16 is rotated in the opposite direction the sections 64 and 65 remain in position until the section 63 has been rotated sufficiently to take up the lost motion and then return the sections 64 and 65 to their original position.

Figure 16:
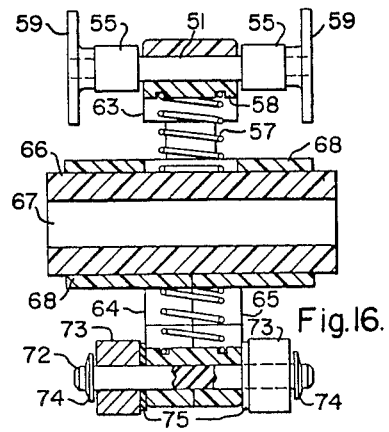
FIG. 16 is a view, partly in section and partly in side elevation of the slip contact rotor assembly.
Figure 18:
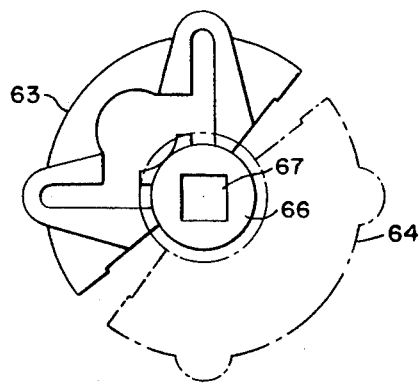
FIG. 18 is a view, in end elevation, of another part of the slip contact rotor.
Figure 17:
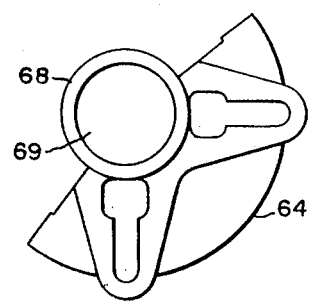
FIG. 17 is a view, in end elevation, of one part of the slip contact rotor assembly.

As shown most clearly in FIG. 16, contact rollers 51 of the type previously described may be mounted in the section 63. These rollers function to bridge two axially spaced contact members in the manner previously described. The contact rollers in the slip portion of the rotor are of a different type. As shown in FIG. 16, an insulating shaft 72 extends through the sections 64 and 65. Two rollers 73 are retained on the shaft 72 by self-locking retaining rings 74. Insulating washers 75 may be provided between the rollers 73 and the arms of the sections 64 and 65. In this manner the rollers retain the sections 64 and 65 assembled on the section 63.

The rollers 73 are composed of a suitable conducting material and are of sufficient diameter to bridge two angularly or circumferentially spaced contact members 37 when they are disposed between the contact members. Thus, two independent circuits may be established by means of the two rollers 73. One circuit is established through one roller 73 and two angularly spaced contact members 37. Another circuit is established through the other roller 73 and two angularly spaced contact members 37. Since the contact rollers 73 are carried by the slip portion of the rotor assembly, these circuits remain closed until the shaft 16 has been rotated sufficiently to take up the lost motion between the rotor section 63 and the sections 64 and 65, and drive them in the opposite direction.

As explained hereinbefore, each contact roller 51 is rotatably mounted in an arm 54 of the rotor assembly 21. This reduces the friction between the contact portions 55 of the contact roller and the heads 38 of the stationary contact members 37 as compared with the friction between sliding contact members. In order to reduce the friction still further, and to obtain the effect of butt contact members during the opening and closing of the contact members, the wheels 59 are provided.

Figure 19:
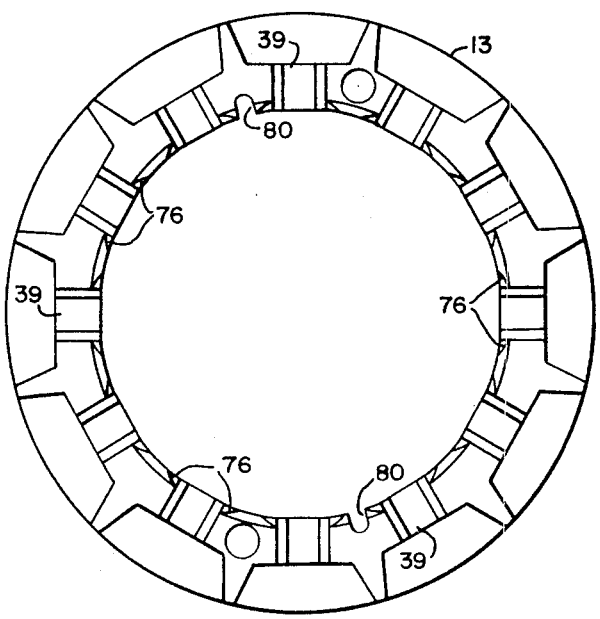
FIG. 19 is a view, in end elevation, of the stationary contact stator housing.
Figure 20:
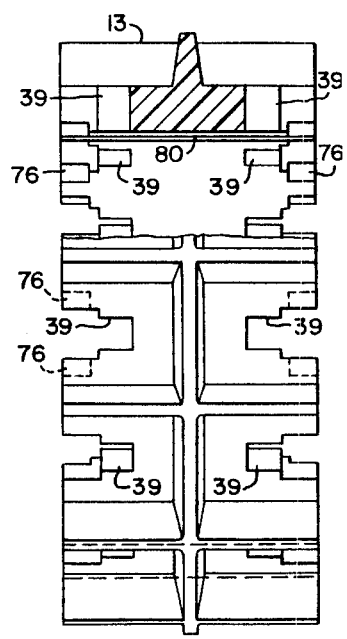
FIG. 20 is a view, partly in side elevation and partly in section, of the stator housing.
Figure 21:
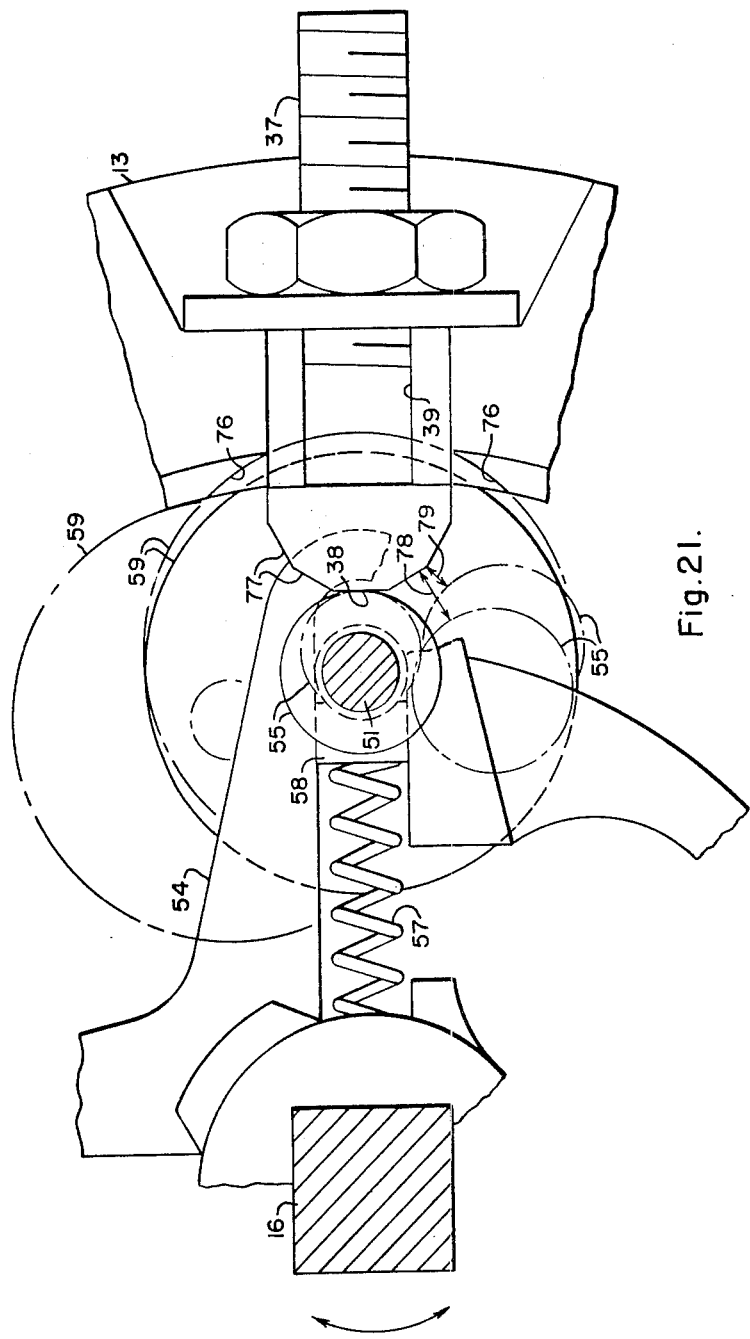
FIG. 21 is an enlarged detail view of a part of a stationary contact and a rotor assembly.

As shown in FIGS. 19 and 21, the edges of the recesses or openings 39 in which the stationary contact members 37 are disposed are beveled at 76. As shown most clearly in the enlarged view 21, each wheel 59 rolls on the inner periphery of the stator housing 13. Thus, when the contact roller 51 and the wheels 59 are traveling between two stationary contact members 37 the spring 57 is compressed by the wheels 59. When the wheels 59 reach the beveled portions 76 the wheels drop into the recesses or openings 39. This causes the contact portions 55 of the roller 51 to engage the head 38 of the contact member 37 with a combined rotary and radial or linear motion. Thus, the engagement between the portion 55 and the head 38 is similar to the engagement between butt contact members having a slight wiping action between the contact members. Furthermore, the friction, and consequently the wear, of the contact members is reduced. If the wheels 59 were not provided, the contact portion 55 of the roller 51 would engage the beveled portions 77 of the contact member 37 and roll along these portions and compress the spring 57 until the portion 55 reaches the end of the contact head 38. When the rotor is rotated to open the contact members, the wheels 59 engage the beveled portions 76 of the stator to compress the spring 57 and disengage the contact members with the combined rotary and radial motion. As shown at 78, the air gap between the contact portion 55 and the contact head 38 is increased when the wheels 59 are provided as compared with the air gap 79 obtained without the wheels 59. In this manner, the interrupting ability of the contact members of the switch is increased.

Figure 31:
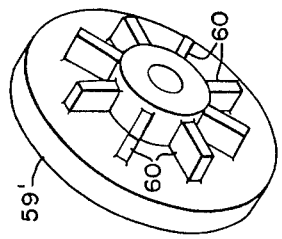

As shown in FIG. 31, fins 60 may be provided on the inner face of each wheel 59. Since the wheels are spinning when they drop into the recesses 39, the fins 60 create a turbulence next to the contacts, thereby reducing arcing between the contacts.

Furthermore, provision is made for taking care of wear between the contact members. As shown in FIG. 21, when the contact members are new the contact portion 55 engages the end of the contact head 38 to prevent the wheel 59 from completely entering the recess 39. As the contact members wear, the wheel 59 is permitted to enter the recess 39 further, thereby maintaining good contact between the contact portion 55 and the head 38 of the stationary contact member 37. The reduction of friction between the contact members reduces the operating effort required to operate the switch as well as reducing the wear on the contact members.

Referring again to FIG. 1, which shows one manner in which contact stages may be assembled in a switch, it will be seen that the upper portion of the first contact stage contains stationary contact members 37, a contact roller 51 and wheels 59 of the type previously described. Thus, these contact members function in the manner previously described.

The second contact stage contains stationary contact members 44 and a normally closed bridging contact member 45 of the type previously described. The bridging contact member 45 is opened by the cam 22. The lower portion of the first contact stage has a contact roller 51 with enlarged portions 55' which are of a greater diameter than the portions 55 shown in the upper part of the first contact stage. It will also be noted that the wheels 59 are omitted from the contact roller 51 on the lower part of the first contact stage. The contact portions 55' cooperate with the contact members of the second stage of the switch to establish a circuit through the contact portions 55' on the roller 51 prior to the opening of the circuit between the bridging member 45 and the contact portions 43 of the contact members 44. This permits the switch to be used as an ammeter switch to change a meter from one current transformer to another without opening the circuit for the secondary winding of the transformers. The upper portion of the first contact stage may be utilized for voltmeter connections or for control purposes.

As previously explained, FIG. 1 shows one manner in which contact stages of the switch may be assembled. It will be understood that additional stages may be added containing contact members of any one of the types herein described.

Figure 5:
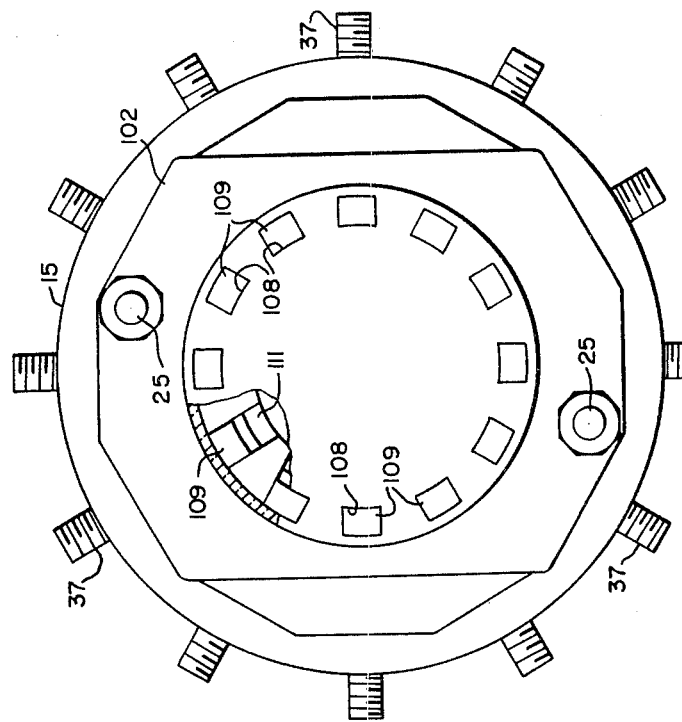
FIG. 5 is a view, in rear elevation, of the switch shown in FIG. 4.

FIGS. 4 and 5 show another manner in which contact stages of the switch may be assembled. The switch shown in FIGS. 4 and 5 is particularly suitable for controlling the operation of circuit breakers. As shown, the first stage contains a slip rotor assembly of the type hereinbefore described. The second stage is of the pull-out type. The stator housing 13 contains stationary contact members 37 as previously described. A push-pull contact assembly 86 is mounted on the shaft 16 and moves axially with the shaft.

Figure 22:
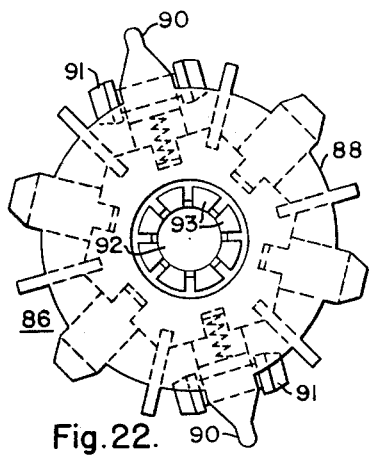
FIGS. 22 and 23 are views in end elevation and in section, respectively, of a pull-out contact assembly.
Figure 23:
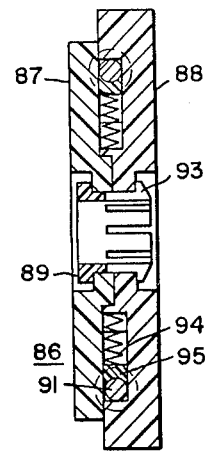
Figure 24:
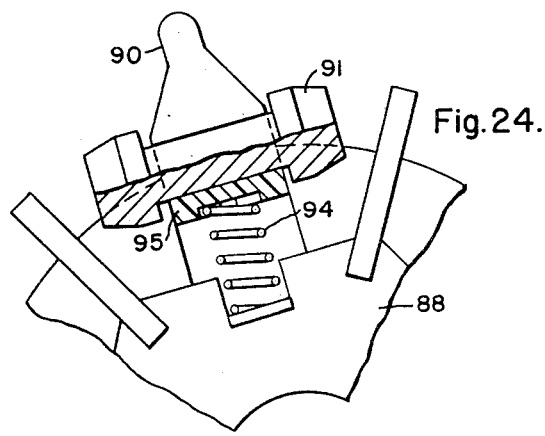
FIG. 24 is an enlarged detail view of the pull-out contact.

As shown most clearly in FIGS. 22, 23 and 24, the assembly 86 comprises two housing sections 87 and 88 which are held together by a bearing 89, and two contact rollers 91 which are rotatably mounted in the housing sections 87 and 88. The housing sections may be molded from a suitable insulating material. The bearing 89 has an opening 92 therethrough of sufficient diameter to permit the shaft 16 to rotate in the bearing. The bearing has a plurality of fingers 93 which hold the housing sections 87 and 88 together when assembled. Each contact roller 91 is biased outwardly by a compression spring 94. A spring seat 95 is disposed between one end of the spring 94 and the contact roller 91.

As shown in FIG. 4, each contact roller 91 bridges two angularly or circumferentially spaced contact members 37 when in the closed position. As also shown in FIG. 4, the contact assembly 86 is retained in position on the shaft 16 by spring washers 96 disposed in grooves on the shaft. The angular position of the assembly 86 is fixed by projections 90 (FIG. 22) which fit into grooves 80 (FIG. 19) in the stationary housing 13.

When the shaft 16 is in the position shown in FIG. 4, each contact roller 91 bridges two angularly spaced stationary contact members 37. The normally closed circuits through the contact members 37 may be opened by pulling the shaft 16 to the left to a position between the two rows of contact members 37 in the second stage of contact members. When the shaft 16 is moved to the left as far as it can travel, the contact rollers 91 bridge angularly spaced contact members 37 in the other row of contact members of the second stage assembly. Also, when the shaft 16 is in its left-hand or outermost position it may be rotated in either direction to operate the contact members of the first contact stage. These contact members are operated in the manner previously described.

The axial and rotational movement of the shaft 16 is controlled by a pull-out assembly 101 disposed at the right-hand end of the switch. The assembly 101 comprises a cover member 102, a guide sleeve 103, a slide 104, and a roller 105 carried by the slide 104 and biased outwardly by a spring 106. The guide 104 is attached to the end of the shaft 16 by a screw 107. The guide 104 is so attached to the shaft that it must rotate with the shaft. The end cover 25 is attached to the switch by means of the bolts 25 which retain the stator housings and the spacer members in position.

Figure 26:
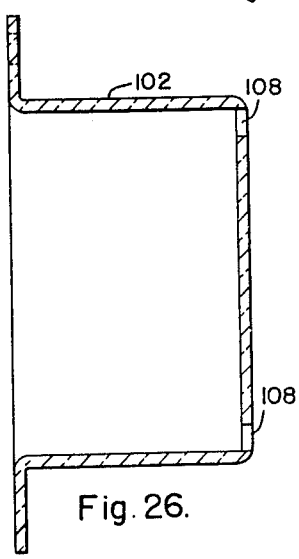
FIG. 26 is a view, in section, of the cover shown in FIG. 25.
Figure 25:
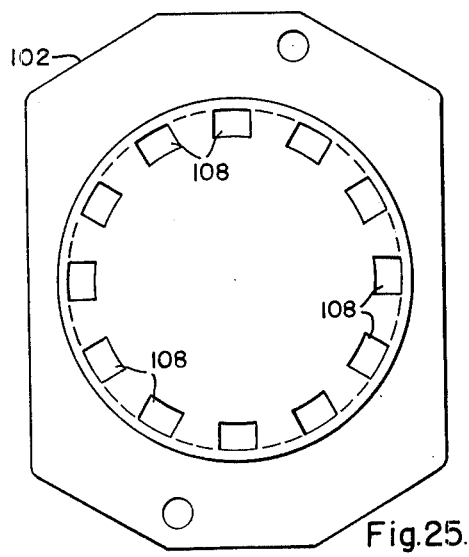
FIG. 25 is a view, in end elevation, of a cover member for the pull-out mechanism.
Figure 29:
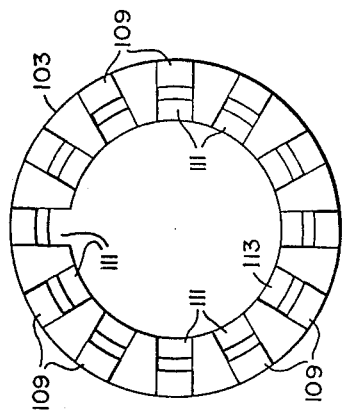
FIG. 29 is a view of the other end of the guide sleeve.
Figure 28:
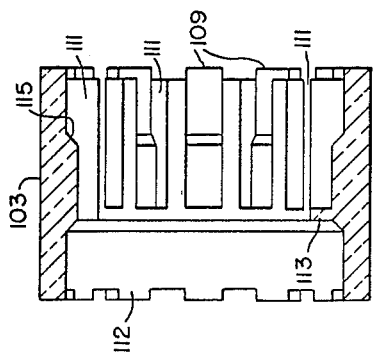
FIG. 28 is a view, in section, of the guide sleeve.
Figure 27:
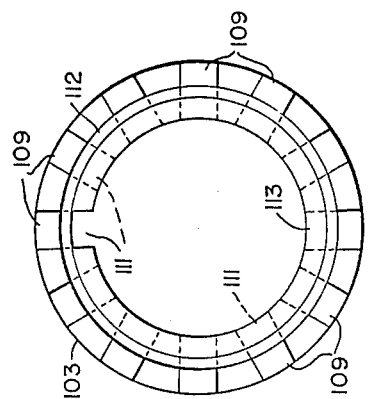
FIG. 27 is a view of one end of a guide sleeve for the pull-out mechanism.

As shown in FIGS. 25 to 29, the end cover 102 is generally of a cup-shape and the guide 103 is a generally cylindrical sleeve. These members are preferably composed of a transparent plastic material, such as a material available under the trade name "LEXAN." As shown in FIGS. 25 and 26, twelve generally rectangular openings 108 are spaced at 30° angles around the bottom of the cup-shaped end cover 102. As shown in FIGS. 27 to 29, twelve projections 109 are provided on each end of the cylindrical guide sleeve 103. The projections 109 are spaced at 30° angles and the projections on one end fit into the openings 108 when the sleeve is inserted into the cover 102. When the sleeve is reversed the projections on the other end will fit into the openings 108. Twelve axial grooves or slots 111 are provided around the interior periphery of the cylindrical sleeve 103. The grooves or slots 111 are spaced at 30° angles. As shown most clearly in FIG. 28 the slots 111 do not extend the full length of the sleeve 103. A peripheral or circumferential groove 112 is provided at one end of the sleeve 103 as shown most clearly in FIG. 28.

As shown most clearly in FIGS. 27 to 29, entrance to all of the slots 111 from the groove 112 is blocked by a partition 113 with the exception of one slot which is left open. As shown in FIG. 4, the roller 105 is disposed in the open slot 111. Thus, when the sleeve 103 is in the position shown in FIG. 4, the shaft 16 may be pulled to the left with the roller 105 traveling in the slot 111 until it enters the peripheral groove 112. The shaft 16 may then be rotated in either direction.

Before the shaft 16 can be moved axially to the right it must be rotated to a position in which the roller 105 can enter the open slot 111. The angular position of the open slot 111 may be changed by rotating the sleeve 103 in the cover 102. The projections 109 which fit into the openings 108 retain the sleeve 103 in the desired angular position. Furthermore, additional slots 111 may be opened to permit entrance of the roller 105 by removing the portion of the partition 113 at the entrance to any slot.

Also, the sleeve 103 may be reversed end-to-end in the cover 102. In this manner the peripheral groove 112 is disposed at the outermost end of the switch. This changes the switch from a pull type to a push type. Also, a peripheral groove 112 may be provided at each end of the sleeve 103.

Figure 30:
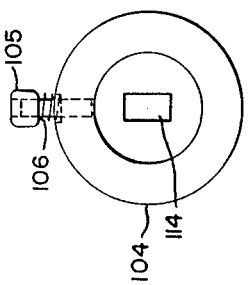
FIG. 30 is a view, in elevation, of a slide member which cooperates with the guide member of the pull-out mechanism; and, FIG. 31 is an enlarged view, in perspective of a modified wheel which may be utilized in the rotor assembly.

As shown in FIG. 30, the slide 104 is provided with a rectangular opening 114 which fits over a rectangular portion on the end of the shaft 16 to cause the guide 104 to rotate with the shaft. As shown in FIG. 4, the roller 105 is frictionally retained in a recess 115 at one end of the slot 111. Likewise, the roller is frictionally retained in the groove 112. In this manner the shaft 16 is releasably restrained against axial movement. Thus, the members of the assembly 101 cooperate to control the rotational and axial movement of the shaft 16 and to control the sequence of operation of the contact members of the switch.

External wiring connections may be made to the stationary contact members disposed in the stator housings. The switch is so constructed and the contact members are so operated that various switching functions may be performed by making the proper external connections to the contact members of the switch. Thus, the switch is capable of performing all of the switching functions normally required of a control switch of the present type.

From the foregoing description, it is apparent that the invention provides a control switch which may be assembled from standardized parts on a per stage basis utilizing subassembly components. Furthermore, extensive flexibility in the application of the swtich is obtained through external wiring connections and adjustable position stops. The switch is so constructed that its operating parts are subjected to a minimum amount of wear. The parts of the switch may be manufactured economically and the switch is relatively easy to assemble and operate.

Since numerous changes may be made in the above-described construction, and different embodiments of the invention may be made without departing from the spirit and scope thereof, it is intended that all the matter contained in the foregoing description or shown in the accompanying drawings shall be interpreted as illustrative and not in a limiting sense.

Certain features of the invention disclosed in this application are claimed in a copending application of Paul Silvius and Clayton T. Walker, Serial No. 283,094, filed May 24, 1963, or in a copending application of Richard Hauser Serial No. 283,093, filed May 24, 1963 which issued September 14, 1965 as U.S. Patent No. 3,206,564 and which is assigned to the same assignee as the present application.

We claim as our invention:

1. A rotary switch having a plurality of stages, each stage comprising a generally cylindrical stator housing, a rotatable shaft extending through the stator housings, a rotor disposed in a first stator housing and rotatable with the shaft, an elongated contact roller rotatably mounted in the rotor, a plurality of pairs of stationary contact members angularly spaced on the periphery of each stator housing, the contact members of each pair being spaced axially of the stator housing, a normally closed contact member bridging a pair of axially spaced stationary contact members in a second stator housing, cam means driven by the shaft for opening said normally closed contact member, and said contact roller bridging a pair of axially spaced stationary contact members in the first stator housing prior to the opening of said normally closed contact member.

2. A rotary switch having a plurality of stages, each stage comprising a generally cylindrical stator housing, a rotatable shaft extending through the stator housings, a rotor disposed in a first stator housing and rotatable with the shaft, an elongated contact roller rotatably mounted in the rotor, a plurality of pairs of stationary contact members angularly spaced on the periphery of each stator housing, the contact members of each pair being spaced axially of the stator housing, a spring-biased contact member normally bridging a pair of axially spaced stationary contact members in a second stator housing, cam means driven by the shaft for disengaging said normally bridging contact member from the stationary contact members, said contact roller bridging a pair of axially spaced stationary contact members in the first stator housing prior to the disengagement of the bridging contact member from the stationary contact members in the second stator housing, and spring means for biasing the contact roller toward the stationary contact members in the first stator housing.

3. A switch having at least a first stage and a second stage, each stage comprising a generally cylindrical stator housing, a rotatable and axially movable shaft extending through the stator housings, a rotor disposed in the first stage stator housing and rotatable with the shaft, a plurality of pairs of stationary contact members angularly spaced on the periphery of each stator housing, the contact members of each pair being spaced axially of the stator housing, a first contact roller rotatably mounted in said rotor, a push-pull contact housing movable axially with the shaft, a second contact roller rotatably mounted in the push-pull housing, said first contact roller bridging two axially spaced stationary contact members when the shaft is rotated, and said second contact roller bridging two angularly spaced stationary contact members when the shaft is moved axially.

4. A switch having at least a first stage and a second stage, each stage comprising a generally cylindrical stator housing, a rotatable and axially movable shaft extending through the stator housings, a rotor disposed in the first stage stator housing and rotatable with the shaft, a plurality of pairs of stationary contact members angularly spaced on the periphery of each stator housing, the contact members of each pair being spaced axially of the stator housing, a first contact roller rotatably mounted in said rotor, a push-pull contact housing movable axially with the shaft, a second contact roller rotatably mounted in the push-pull housing, said first contact roller bridging two axially spaced stationary contact members when the shaft is rotated, said second contact roller bridging two angularly spaced stationary contact members when the shaft is moved axially, an end cover attached to the second stage stator housing, a slotted guide sleeve disposed in said end cover, and a slide member attached to the shaft to cooperate with the guide sleeve in determining axial and rotary movement of the shaft.

5. A switch having at least a first stage and a second stage, each stage comprising a generally cylindrical stator housing, a rotatable and axially movable shaft extending through the stator housings, a rotor disposed in the first stage stator housing and rotatable with the shaft, a plurality of pairs of stationary contact members angularly spaced on the periphery of each stator housing, the contact members of each pair being spaced axially of the stator housing, a first contact roller rotatably mounted in said rotor, a push-pull contact housing movable axially with the shaft, a second contact roller rotatably mounted in the push-pull housing, said first contact roller bridging two axially spaced stationary contact members when the shaft is rotated, said second contact roller bridging two angularly spaced stationary contact members when the shaft is moved axially, an end cover attached to the second stage stator housing, a slotted guide sleeve disposed in said end cover, said guide sleeve being adjustable angularly in said end cover, and a slide member attached to the shaft to cooperate with the guide sleeve in determining axial and rotary movement of the shaft.

6. A switch having at least a first stage and a second stage, each stage comprising a generally cylindrical stator housing, a rotatable and axially movable shaft extending through the stator housings, a rotor disposed in the first stage stator housing and rotatable with the shaft, a plurality of pairs of stationary contact members angularly spaced on the periphery of each stator housing, the contact members of each pair being spaced axially of the stator housing, a first contact roller rotatably mounted in said rotor, a push-pull contact housing movable axially with the shaft, a second contact roller rotatably mounted in the push-pull housing, said first contact roller bridging two axially spaced stationary contact members when the shaft is rotated, said second contact roller bridging two angularly spaced stationary contact members when the shaft is moved axially, an end cover attached to the second stage stator housing, a slotted guide sleeve disposed in said end cover, said guide sleeve being reversible end-to-end and adjustable angularly in said end cover, and a slide member attached to the shaft to cooperate with the slot in the guide sleeve in determining axial and rotary movement of the shaft.

7. A switch having at least a first stage and a second stage, each stage comprising a generally cylindrical stator housing, a rotatable and axially movable shaft extending through the stator housings, a rotor disposed in the first stage stator housing and rotatable with the shaft, a plurality of pairs of stationary contact members angularly spaced on the periphery of each stator housing, the contact members of each pair being spaced axially of the stator housing, a first contact roller rotatably mounted in said rotor, a push-pull contact housing movable axially with the shaft, a second contact roller rotatably mounted in the push-pull housing and normally bridging two angularly spaced stationary contact members, said first contact roller bridging two axially spaced stationary contact members when the shaft is rotated, and said second contact roller being disengaged from said two angularly spaced stationary contact members when the shaft is moved axially a predetermined distance.

8. A switch having at least a first stage and a second stage, each stage comprising a generally cylindrical stator housing, a rotatable and axially movable shaft extending through the stator housings, a rotor disposed in the first stage stator housing and rotatable with the shaft, a plurality of pairs of stationary contact members angularly spaced on the periphery of each stator housing, the contact members of each pair being spaced axially of the stator housing, a first contact roller rotatably mounted in said rotor, a push-pull contact housing movable axially with the shaft, a second contact roller rotatably mounted in the push-pull housing and normally bridging two angularly spaced stationary contact members, said first contact roller bridging two axially spaced stationary contact members when the shaft is rotated, and said second contact roller being moved out of engagement with said two angularly spaced stationary contact members and into engagement with another two angularly spaced stationary contact members by moving the shaft axially.

9. A switch having at least a first stage and a second stage, each stage comprising a generally cylindrical stator housing, a rotatable and axially movable shaft extending through the stator housings, a rotor disposed in the first stage stator housing and rotatable with the shaft, a plurality of pairs of stationary contact members angularly spaced on the periphery of each stator housing, the contact members of each pair being spaced axially of the stator housing, a first contact roller rotatably mounted in said rotor, a push-pull contact housing movable axially with the shaft, a second contact roller rotatably mounted in the push-pull housing, said first contact roller bridging two axially spaced stationary contact members when the shaft is rotated, said second contact roller bridging two angularly spaced stationary contact members when the shaft is moved axially, an end cover attached to the second stage stator housing, a slotted guide sleeve disposed in said end cover, a recess at one end of the slot in the guide sleeve, a slide attached to the shaft and having a spring-biased member thereon cooperating with the guide sleeve in determining axial and rotary movement of the shaft, and said spring-biased member being releasably retained in said recess by friction.

10. A switch having at least a first stage and a second stage, each stage comprising a generally cylindrical stator housing, a rotatable and axially movable shaft extending through the stator housings, a rotor disposed in the first stage stator housing and rotatable with the shaft, a plurality of pairs of stationary contact members angularly spaced on the periphery of each stator housing, the contact members of each pair being spaced axially of the stator housing, a first contact roller rotatably mounted in said rotor, a push-pull contact housing movable axially with the shaft, a second contact roller rotatably mounted in the push-pull housing, said first contact roller bridging two axially spaced stationary contact members when the shaft is rotated, said second contact roller bridging two angularly spaced stationary contact members when the shaft is moved axially, an end cover attached to the second stage stator housing, a guide sleeve disposed in said end cover, a plurality of axially extending slots in the guide sleeve, a circumferential groove at one end of said sleeve, at least one of said slots being open to said groove, said guide sleeve being reversible end-to-end and adjustable angularly in said end cover, and a slide member attached to the shaft to cooperate with the slot and the groove in determining axial and rotary movement of the shaft.

11. A rotary switch having a plurality of stages, each stage comprising a generally cylindrical stator housing, a rotatable shaft extending through the stator housings, a rotor disposed in a first stator housing and rotatable with the shaft, an elongated contact roller rotatably mounted in the rotor, a plurality of pairs of stationary contact members angularly spaced on the periphery of each stator housing, the contact members of each pair being spaced axially of the stator housing, a guide member disposed between a pair of axially spaced stationary contact members in a second stator housing, said stationary contact members in the second housing having inner ends extending toward each other, a bridging contact member disposed in said guide member, a spring biasing said bridging contact member into engagement with the inner ends of said stationary contact members, cam means driven by the shaft for disengaging said bridging contact member from the stationary contact members, and said contact roller bridging a pair of axially spaced stationary contact members in the first stator housing prior to the disengagement of the bridging contact member from the stationary contact members in the second stator housing.

12. A rotary switch having a plurality of stages, each stage comprising a generally cylindrical stator housing, a rotatable shaft extending through the stator housings, a rotor disposed in a first stator housing and rotatable with the shaft, an elongated contact roller rotatably mounted in the rotor, a plurality of pairs of stationary contact members angularly spaced on the periphery of each stator housing, the contact members of each pair being spaced axially of the stator housing, a guide member disposed between a pair of axially spaced stationary contact members in a second stator housing, said stationary contact members in the second housing having inner ends extending toward each other, a bridging contact member disposed in said guide member, a spring biasing said bridging contact member into engagement with the inner ends of said stationary contact members, cam means driven by the shaft for disengaging said bridging contact member from the stationary contact members, said elongated contact roller having enlarged portions at its ends engaging a pair of axially spaced stationary contact members in the first stator housing prior to the disengagement of the bridging contact member from the stationary contact members in the second stator housing, and spring means carried by the rotor for biasing the elongated contact roller toward the stationary contact members in the first stator housing.

References Cited by the Examiner

UNITED STATES PATENTS

| | | | |
|---|---|---|---|
| 2,260,350 | 10/1941 | Stout et al. | 200—4 |
| 2,263,754 | 11/1941 | Batcheller | 200—4 |
| 2,418,616 | 4/1947 | Batcheller | 200—166 X |
| 2,506,761 | 5/1950 | Alexander et al. | 74—527 |
| 2,909,940 | 10/1959 | Dawkins | 74—527 |
| 3,125,702 | 3/1964 | Herridge et al. | 200—16 X |
| 3,142,187 | 7/1964 | Kane et al. | 200—16 X |
| 3,150,240 | 9/1964 | Voss | 200—16 X |

KATHLEEN H. CLAFFY, *Primary Examiner.*

BERNARD A. GILHEANY, *Examiner.*